United States Patent [19]

Hutzel et al.

[11] Patent Number: 5,521,806
[45] Date of Patent: May 28, 1996

[54] VEHICLE UTILITY/EMERGENCY LIGHT ASSEMBLY

[75] Inventors: Barry W. Hutzel; Jon K. Nisper; Adam Deck; David Fry, all of Holland; Hassel J. Savard, Jr., Grand Rapids; Robert Arterburn, Grand Haven, all of Mich.

[73] Assignee: Donnelly Corporation, Holland, Mich.

[21] Appl. No.: 213,563

[22] Filed: Mar. 16, 1994

[51] Int. Cl.⁶ .................................................. F21V 27/00
[52] U.S. Cl. .................. 362/387; 362/80; 362/258; 362/276; 362/388; 362/399; 362/802; 340/473
[58] Field of Search ...................... 340/472, 473; 362/61, 80, 83.3, 96, 253, 258, 387, 394, 395, 276, 388, 399, 802

[56] References Cited

U.S. PATENT DOCUMENTS

| | | | |
|---|---|---|---|
| D. 286,134 | 10/1986 | Schwartz | D13/140 |
| 914,772 | 3/1909 | Williamson | 362/387 |
| 982,651 | 1/1911 | Wellman | 362/258 |
| 994,291 | 6/1911 | Williamson | 362/387 |
| 1,259,823 | 3/1918 | Archer et al. | 362/387 |
| 1,300,454 | 4/1919 | Nikonow | 362/258 |
| 1,319,473 | 10/1919 | Grigsby | 362/258 |
| 1,392,441 | 10/1921 | Nikonow | 362/258 |
| 1,431,822 | 10/1922 | Lamb | 362/208 |
| 1,491,354 | 4/1924 | Marty, Jr. | 340/473 |
| 1,493,730 | 5/1924 | Cadmus | 362/258 |
| 1,534,991 | 4/1925 | Reeves | 362/127 |
| 1,630,843 | 5/1927 | Halin | 362/387 |
| 1,652,964 | 12/1927 | Walker | 362/387 |
| 1,656,648 | 1/1928 | Woller | 362/387 |
| 1,680,508 | 8/1928 | Downing | 362/387 |
| 1,730,104 | 10/1929 | Wheat | 191/12.4 |
| 1,951,330 | 3/1934 | Gibson | 242/382 |
| 2,009,682 | 7/1935 | Stofer | 362/258 |
| 2,070,561 | 2/1937 | Cantor | 191/12.4 |
| 2,079,532 | 5/1937 | Sheppard | 362/387 |
| 2,089,850 | 8/1937 | Kenney | 362/80 |
| 2,166,062 | 7/1939 | Koch, Jr. | 362/387 |
| 2,168,118 | 8/1939 | Dickson | 362/387 |
| 2,206,094 | 7/1940 | Hobbs | 362/80 |
| 2,221,295 | 11/1940 | Bryk | 362/394 |
| 2,407,737 | 9/1946 | Erasmus | 362/387 |
| 2,424,719 | 7/1947 | Stoeck et al. | 362/258 |
| 2,507,541 | 5/1950 | Patterson | 362/387 |
| 2,511,893 | 6/1950 | Alden | 340/473 |
| 2,525,163 | 10/1950 | Zadig | 362/387 |
| 2,579,653 | 12/1951 | Dawley | 362/80 |
| 2,591,131 | 4/1952 | Brus | 362/258 |
| 2,611,834 | 9/1952 | Simons | 191/12.4 |
| 2,654,828 | 10/1953 | Vandenberg | 362/258 |
| 2,655,592 | 10/1953 | Michel et al. | 362/387 |
| 2,671,848 | 3/1954 | Swayne | 362/61 |
| 2,785,292 | 3/1957 | Walleroth | 362/396 |

(List continued on next page.)

FOREIGN PATENT DOCUMENTS

| | | | |
|---|---|---|---|
| 58-10007A | 6/1983 | Japan | 242/96 |
| 191007 | 11/1923 | United Kingdom | 191/12.2 R |

OTHER PUBLICATIONS

Sep., 1992–PN96 Utility Lamp Proposal prepared by Donnelly Corporation.

*Primary Examiner*—Denise L. Gromada
*Assistant Examiner*—Alan B. Cariaso
*Attorney, Agent, or Firm*—Van Dyke, Gardner, Linn & Burkhart

[57] ABSTRACT

A utility emergency light assembly for vehicles, machinery, or the like detachably mounted by a slide coupling to a mounting bracket attached to the vehicle or machine. The light assembly has a compact, space-saving profile and includes a housing having a lamp assembly mounted within a spool journaled in the housing for reeling and unreeling a power cord, enabling movement of the assembly to areas of the vehicle where light is needed. A cap substantially closes the housing and includes a lens located over the lamp assembly. The lamp assembly is sealed within the spool, while the remainder of the housing is open to allow water drainage and to prevent the accumulation of moisture and debris.

37 Claims, 5 Drawing Sheets

U.S. PATENT DOCUMENTS

| | | | |
|---|---|---|---|
| 2,816,277 | 12/1957 | Salkowski | 340/473 |
| 2,891,235 | 6/1959 | Halpert | 340/472 |
| 2,938,110 | 5/1960 | Busch et al. | 362/258 |
| 3,014,123 | 12/1961 | Mainzer | 40/541 |
| 3,109,597 | 11/1963 | Baldwin | 362/308 |
| 3,316,361 | 4/1967 | Thompson | 191/12.4 |
| 3,322,944 | 5/1967 | Mellyn | 362/258 |
| 3,369,084 | 2/1968 | Cook | 191/12.4 |
| 3,378,681 | 4/1968 | Meyer et al. | 362/387 |
| 3,439,159 | 4/1969 | McRoskey et al. | 362/258 |
| 3,576,409 | 4/1971 | Fiddler | 200/61.62 |
| 3,582,639 | 6/1971 | Chamberlain | 362/80 |
| 3,812,307 | 5/1974 | Wagner et al. | 200/52 R |
| 3,815,078 | 6/1974 | Fedrick | 439/501 |
| 3,823,384 | 7/1974 | Messmer et al. | 340/473 |
| 3,837,448 | 9/1974 | Hagstrom | 191/12.4 |
| 3,870,133 | 3/1975 | Brennenstuhl | 191/12.2 R |
| 4,054,789 | 10/1977 | Romanelli | 362/80 |
| 4,241,385 | 12/1980 | Asano | 362/258 |
| 4,244,536 | 1/1981 | Harrill | 242/405.3 |
| 4,282,954 | 8/1981 | Hill | 191/12.4 |
| 4,316,239 | 2/1982 | Cass et al. | 362/155 |

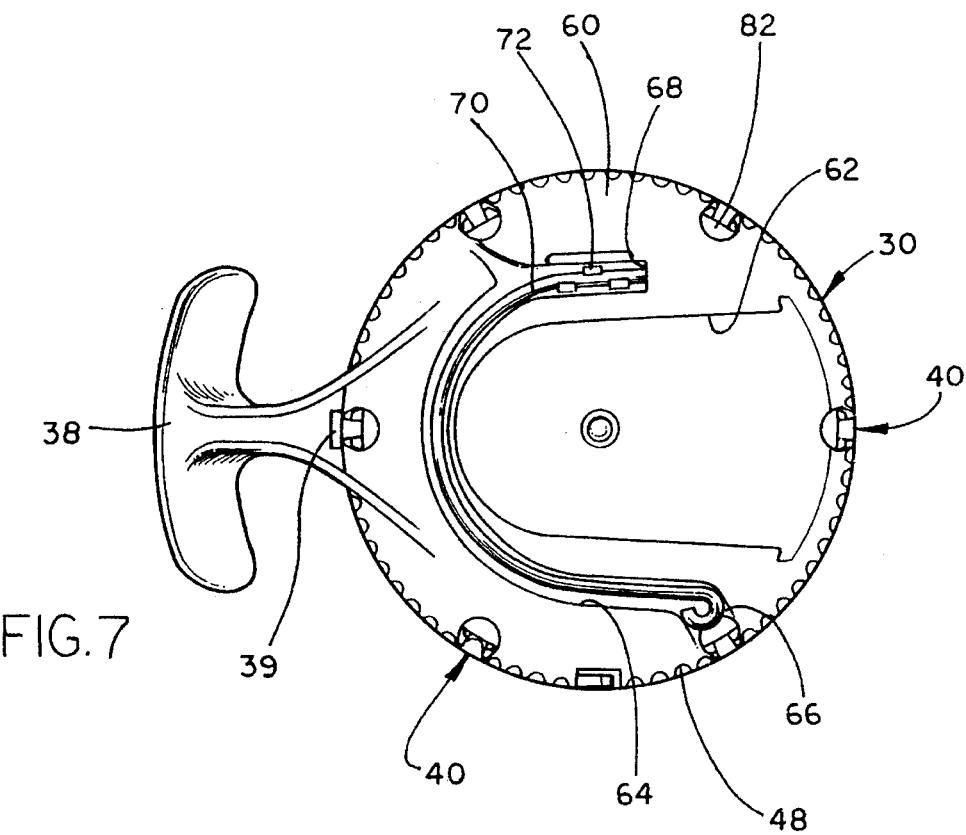
FIG.7
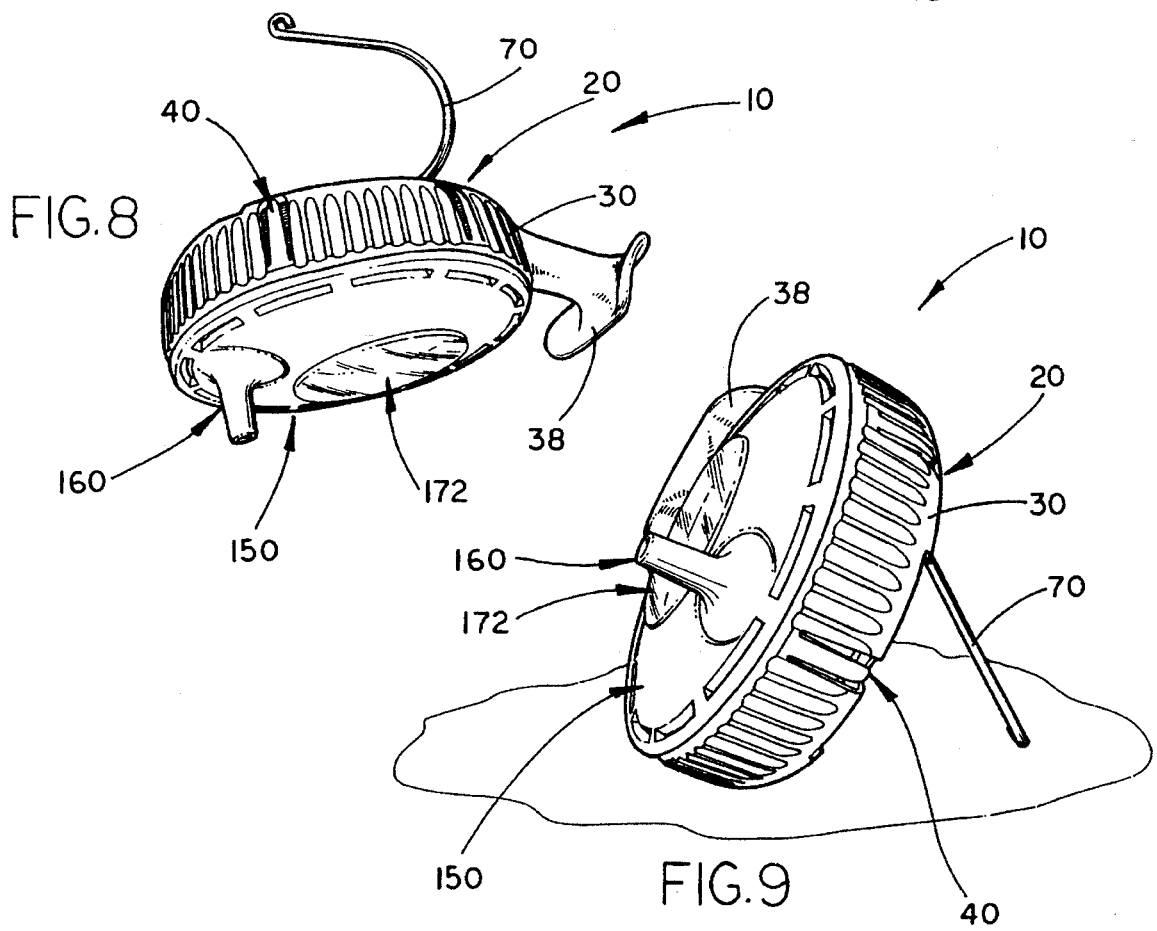
FIG.8
FIG.9

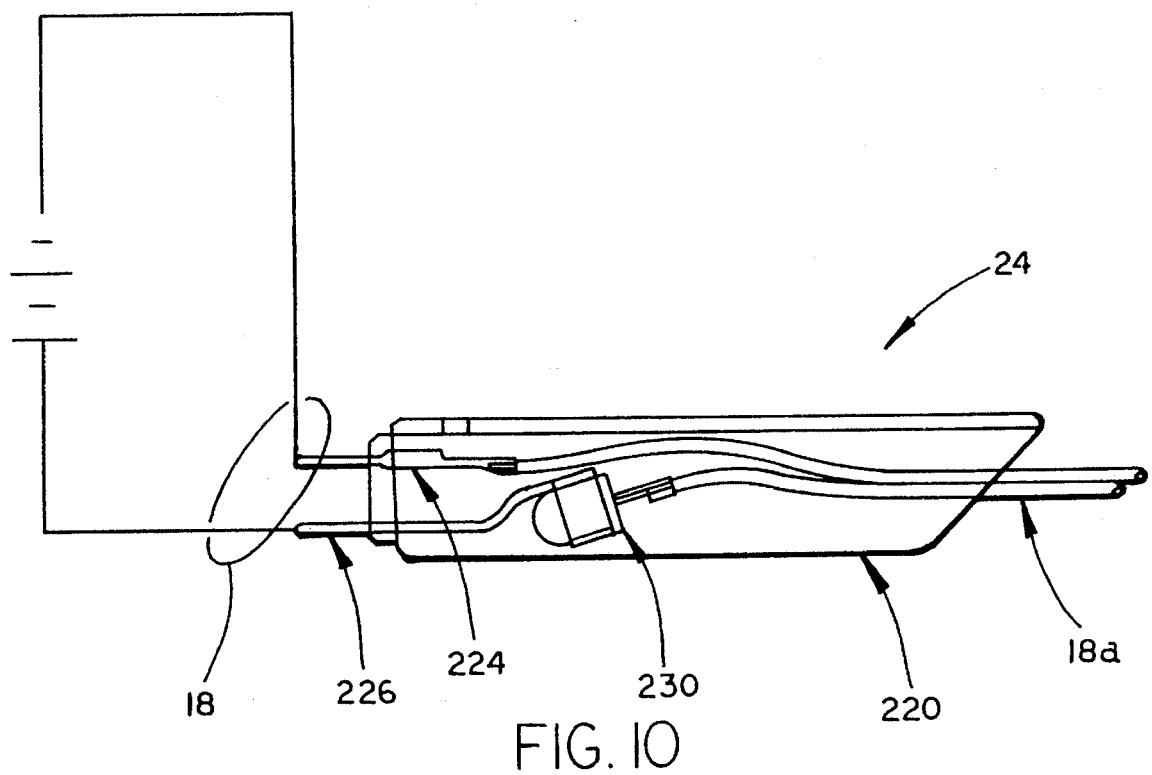

VEHICLE UTILITY/EMERGENCY LIGHT ASSEMBLY

FIELD OF THE INVENTION

The present invention relates generally to a light fixture, and more particularly to a detachable compartment light for use primarily in vehicles for utility and emergency applications, but is also useful on machinery, drill rigs, work shops, or the like.

BACKGROUND OF THE INVENTION

As is well known, vehicles occasionally suffer mechanical failures, the most common being flat tires. Occasionally, a supplemental light is required to diagnose and/or repair the particular problem, particularly at night. When such mishaps occur, the operator may not have a flashlight or other source of light to assist them in resolving the problem.

Many vehicles come equipped with an engine compartment light which is fixed to the underside of the engine compartment hood and is turned on when the hood is raised. Similarly, the trunk or storage compartment may also be equipped with a light fixture which is turned on when the trunk lid or compartment door is opened. Such lamps are typically fixed in place and broadly cast light into the compartment leaving portions of the compartment in shadows. One example of such a light fixture is disclosed in U.S. Pat. No. 4,683,521 to Poleschuk.

In the past, vehicles have also been equipped with compartment lights which are detachable to illuminate specific areas of interest. Such a light fixture is connected by a length of wire to the vehicle power supply, and typically includes a bulb mounted in a socket, which, in turn, is fixed to a structure removable from the vehicle. A reflector may be located adjacent the bulb to direct light from the bulb in a specific direction. Many of the prior structures have also included a space to store the conductor wire when not in use.

Significant disadvantages associated with such light fixtures include the inability to seal the bulb and socket from the elements, thus resulting in a failure of the light fixture due to rust, corrosion, and shorting of the bulb contacts in the base. Moreover, many of the previous structures did not provide a beam of light sufficiently focused to strongly illuminate a particular area, but, broadly cast the light from the bulb and an adjacent reflector. A related problem was the inability to support such prior light fixtures in a desired position to properly direct the light. In many cases, the fixture had to be held during use thereby restricting the user's ability to use both hands on a required repair or similar task. In addition, the prior light fixtures did not provide a convenient method for reeling in and paying out the conductor cable used to power the bulb. Further, none of the prior detachable compartment light fixtures were contained in a single, compact, ergonomic package.

The present light assembly was conceived in recognition of and as a solution for these and other related problems with prior known vehicle light fixtures.

SUMMARY OF THE INVENTION

Accordingly, the present invention provides a utility/emergency light assembly mountable on a vehicle, machinery, or the like, to light engine, trunk, or other compartments while being removable for use as an emergency/trouble light for vehicle or other repairs while remaining tethered to the vehicle electrical system.

Broadly, the vehicle light assembly includes a low-profile, space-saving housing slidably retained by a mounting bracket to a substrate. The housing preferably includes a bulb light source operably coupled to a position-responsive switch also retained by the mounting bracket. The position-responsive switch is, in turn, operably coupled to a remote power source on the vehicle by a second conductor.

In one embodiment of the invention, the housing includes a spool journaled therein, which has a cavity to contain the bulb or lamp. The spool receives a cap which substantially closes the housing and contains a lens which is located above, and also seals the bulb cavity from the elements. The cap is positively coupled to the spool and includes a handle to be used to rotate the spool and pay the conductor in and out from the spool. The spool is journaled in the housing and retained therein by a plurality of tabs engaging an end wall of the spool proximate the bottom of the housing.

Other embodiments of the vehicle light assembly include a bail attached to an exterior surface of the housing to independently support or prop the housing at a desired orientation for hands free operation. A lamp assembly within the housing includes a reflector adjacent a lamp for directing light produced by the lamp out through the lens in the cap. The lamp is sealed in the cavity by the lens and an associate O-ring and by the lamp base to protect it from the harmful effects of moisture and debris.

The advantages offered by the present invention include a rugged, detachable light source having a longer, useful life than prior light fixtures resulting from sealing a bulb or lamp in an ergonomic structure which does not accumulate moisture and debris. The light assembly has a low profile especially adapted for mounting in a confined space such as that beneath the hood or trunk lid in a vehicle engine or trunk compartment. Once installed, the lamp in the assembly is adapted for automatic on/off operation simply by raising or lowering the hood, trunk lid, or other vehicle component on which it is mounted. The light assembly can be readily detached by hand with ease and without tools from its mounting bracket for relocation to the area around or in the vehicle where it is needed, and includes a support for positioning the assembly in a suitable, temporary position to provide light where needed. The support incorporates a breakaway feature allowing release of the support if bent or moved too far. The support can then be reinstalled by the user. The light assembly is permanently tethered to the vehicle by its extendible/retractable power cord to prevent loss through theft or being misplaced. However, it can be used for multiple purposes such as a spotlight, flashlight, emergency/trouble light, or hazard warning alert. Once use of the light assembly is completed, the operator can easily recover the paid-out wire by reeling it up on the self contained spool and reattaching the assembly to the mounting bracket for storage.

BRIEF DESCRIPTION OF THE DRAWING FIGURES

A better understanding of the invention and the advantages provided thereby may be obtained by reference to the specification and the attached drawing figures, wherein:

FIG. 1 generally illustrates one embodiment of the invention attached to the underside of a vehicle hood;

FIG. 7 is a plan view of the bottom of one embodiment of the housing;

FIGS. 8 and 9 are perspective views illustrating support of the invention by the support/bail when removed from the mounting bracket; and FIG. 10 is a longitudinal section view of one embodiment of a position-responsive switch.

DETAILED DESCRIPTION OF THE PREFERRED EMBODIMENTS

Figure 1:
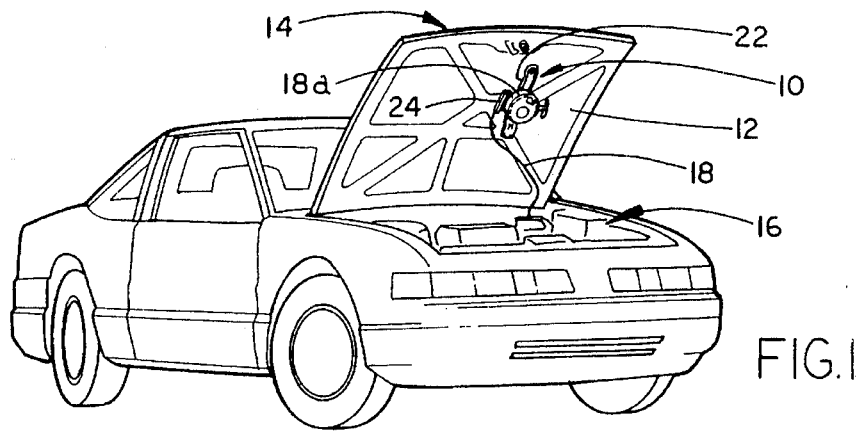

Referring now to the drawings in greater detail, one embodiment 10 of the utility/emergency light assembly of the invention in FIG. 1 is shown attached to an underside 12 of a vehicle hood 14 of an engine compartment 16. The light assembly 10 is operably coupled by a conductor 18, 18a described in greater detail below, to the electrical system of the vehicle. As shown in FIGS. 2–5, light assembly 10 generally includes a casing or housing 20 detachably retained on hood 14 by a mounting bracket 22 which also retains a position-responsive switch 24 interconnecting in series conductors 18 and 18a (FIGS. 1–3 and 10). As will be described in greater detail below, casing or housing 20 is adapted to be detachable from mounting bracket 22 on the vehicle and located appropriately to illuminate an area of interest. Conductor 18a extending from position-responsive switch 24 and stored in casing 20 provides electrical power to the lamp assembly including a bulb contained within housing 20.

According to one embodiment of the invention, casing 20 includes a lower body or container portion 30 having an interior bottom surface 32 terminating at its peripheral edge in an upright, annular wall 34 which extends generally perpendicularly to bottom 32, which defines an interior volume or cavity 36. Although bottom surface 32 and wall 34 of container 30 may generally define any geometric shape, it is preferred that wall 34 be cylindrical in form and have a diameter on the order of 6 inches or less so as to fit in the palm of the user. To facilitate handling, a handle 38 may protrude from the exterior of container 30, formed either as an integral portion of container 30, or as a separate piece and attached by a mechanical fastener extending through bottom 32 and/or wall 34. Although handle 38 is shown as having a contoured, T-shaped configuration, other shapes may be used equally as well including pistol grip, straight rod, spherical, etc., so long as the operator can obtain a firm grip to manipulate the light assembly. A drain hole 39 is provided in the bottom 32 adjacent handle 38 to allow release of any water collected within housing 30 (FIG. 7). Wall 34 also contains a plurality of radially spaced tabs 40 (FIGS. 3 and 5) formed in the wall to define finger-like projections contained in the same curvilinear plane defining wall 34. Each tab 40 includes a projection 42 located at its lowermost edge, and extending inwardly toward the center of cavity 36. Each projection 42 includes an upwardly tapered surface 44 terminating in a lower shoulder 46, the purpose of which will become readily apparent below. Also provided on container 30, to facilitate handling of the light assembly 10, are scalloped depressions 48 (FIG. 3) formed in the exterior circumference of wall 34. Each depression 48 allows the operator to better grip container 30 when placed in the palm of the hand. The gripping ability may also be provided by other texturing patterns, such as very closely spaced parallel grooves, crosshatching, dimples, or the like, so long as the circumference of container 30 is preferably roughened and increases friction with the user's hand.

Bottom surface 32 of interior cavity 36 is generally planar and perpendicular with respect to upstanding wall 34 with the exception of a raised, tongue-shaped ledge 50 extending from wall 34 diametrically opposite handle 38, and extending beyond a center point 52 toward the opposite portion of wall 34 proximate handle 38. Defined on an upper surface of ledge 50, and concentric with central axis 54 passing through base 32, is a ring 56 (FIGS. 3–5) to provide a bearing surface described in greater detail below. The exterior surface 60 opposite surface 32 (FIG. 7) includes a tongue-shaped recess or channel 62 complimentary in form to the shape of ledge 50 defined earlier. Generally concentric with channel 62, and recessed in lower surface 60, is a U-shaped channel 64 having one end 66 terminating at a peripheral edge of lower surface 60 while the opposite end 68 terminates inboard of the peripheral edge of surface 60. Channel 64 retains a U-shaped, metal or wire bail 70 having one end fixed in channel 64 by a pivot mount 72. Bail 70 will release from mount 72 if bent too far after which it can easily be reinstalled in channel 64 and mount 72 by the user. Bail 70 may also be retained in channel 64 by one end received in a hole formed in the bottom surface 60 during the manufacture of container 30. For example, container 30 may be molded from a polymeric material, preferably from a material selected from the group of polypropylenes, and most preferably a thirty percent glass-polypropylene such as available from Eastman Co. under the brand name ECTAR™ FB-PG.

Concentrically received in cavity 36 (FIGS. 3–6) is a spool or reel 80 including a lower or bottom end wall 82 and an upper end wall 84 separated from each other by an intervening wall or support 86. An upper portion 88 of support 86 extends through upper end wall 84 to define a cavity 90. Extending from upper end wall 84, and concentric with and surrounding upper portion 88, is a second wall 92 defining an annular groove or channel 94 (FIG. 6) which has a bottom 96 terminating and defined by the upper surface of upper end wall 84. Likewise, the bottom 98 of cavity 90 is defined by end wall 82. Located between end walls 82, 84, and extending through intervening wall or support 86 is a hole 100. Bounding hole 100 and extending outwardly from support 86 are flanges 102 and 104, oriented generally parallel to each other and equidistant from hole 100 (FIG. 6). The ends of flange 102, 104, away from support 86, each transition to a curved wall 106, 108 which flare backwards from the distal end of each flange 102, 104 and from hole 100, and rejoin support 86. Hole 100 and flanges 102, 104 receive and position a portion of the lamp assembly described in greater detail below.

Figure 4:
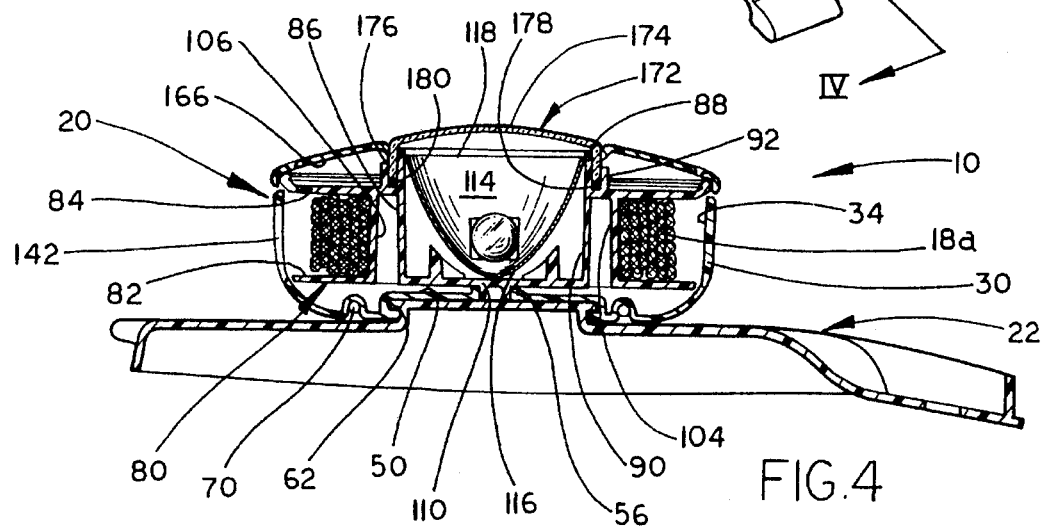
FIG. 4 is a sectional view of one embodiment of the invention taken along plane IV—IV in FIG. 2.
Figure 5:
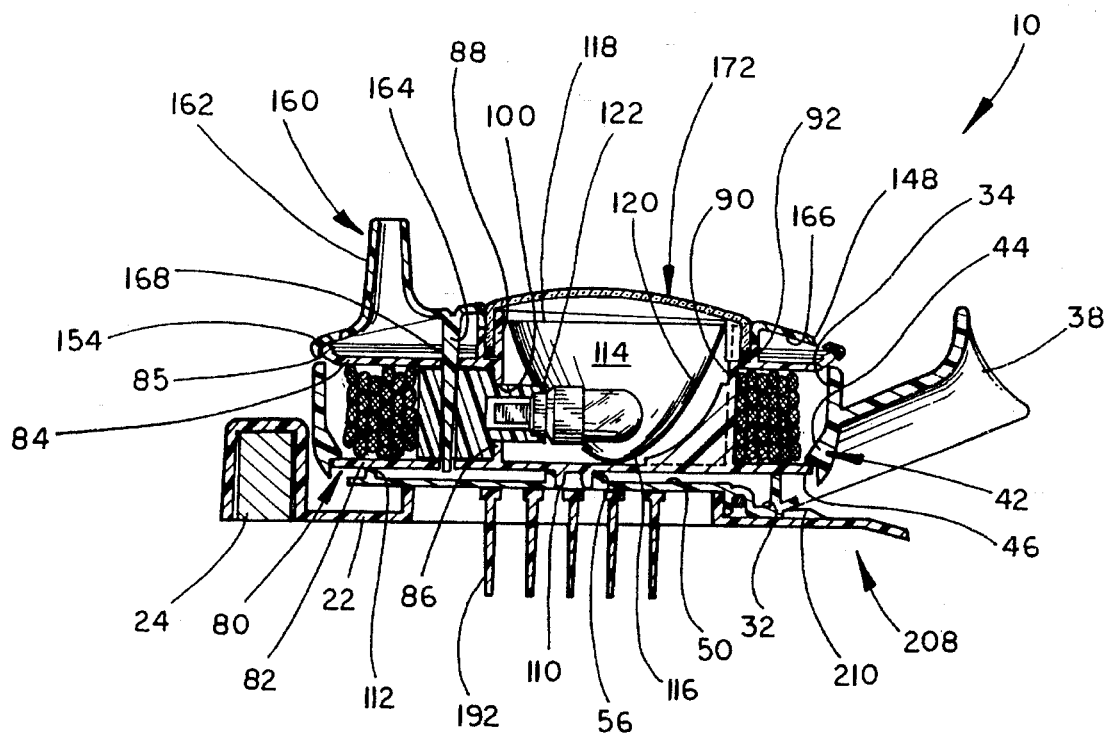
FIG. 5 is a cross section of the invention taken along plane V—V in FIG. 2.
Figure 6:
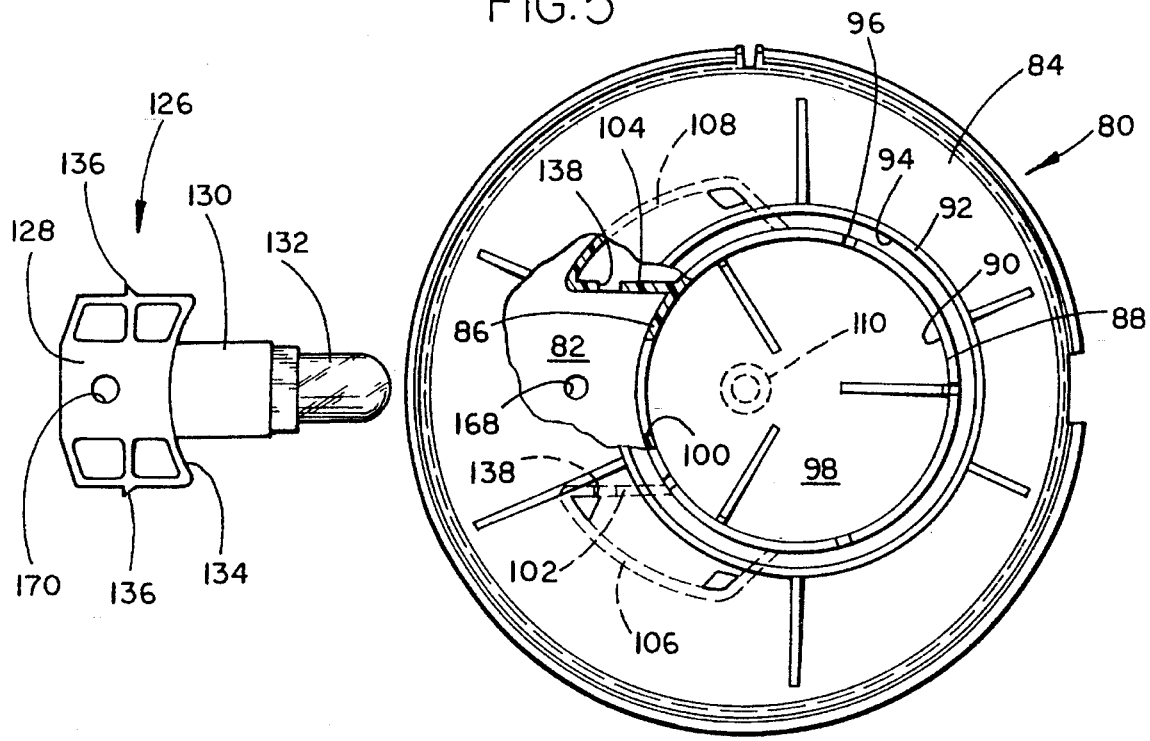
FIG. 6 is a top plan view of one embodiment of a spool used in the invention.

Spool or reel 80 is journaled within container portion 30 of housing 20 by a centering pin 110 extending from the lower surface of bottom end wall 82 and received within ring 56 defined in the upper surface of the tongue-shaped ledge 50 (FIGS. 4–5). The outer circumference of centering pin 110 and the portion of lower end wall 82, with the inner circumference and the upper edge of ring 56, form a bearing surface about which spool 80 may be rotated within the container 30. Second and third bearing surfaces are defined between container 30 and spool 80 by an upper edge of flange 112 on container 30 engaging the bottom of lower end wall 82 and by the shoulders 46 of tabs 40 engaging the upper peripheral edge of lower end wall 82. The shoulder portion 46 of each tab 40 retains spool 80 within container 30 but with sufficient pressure so as to allow spool 80 to rotate about axis 54 within the container 30. To reduce the friction on the bearing surfaces and allow easier rotation of spool 80, it is preferred that spool 80 be manufactured from a polymeric material which is either self-lubricating or has a low-coefficient of friction. Preferred materials include thermoplastics, such as acetal resins, ABS, polytrifluorochloroethylene, polytetrafluoroethylene, polypropylene, high-density polyethylene, and the like. Most preferably, spool 80 is made from an acetal resin available from E.I. dupont de Nemours & Co., Inc., under the trade name DELRIN™.

Disposed in cavity 90 is a parabolic reflector 114 (FIGS. 3–5) having an apex 116 proximate lower end wall 82 and an upper, open end 118 proximate the upper end of portion 88. It is preferred that the outer circumference of end 118 be substantially the same as, or slightly less than, the inner circumference of cavity 90 at the top of upper portion 88 to orient reflector 114 with cavity 90. Extending through a sidewall 120 of the reflector 114 nearer apex 116 is an opening 122, for reasons which will become apparent below. It is preferred that reflector 114 be formed from die-stamped aluminum wherein the concave surface is polished to reflect light. Alternatively, reflector 114 may be made from a polymeric material. If such material were used, the concave surface of reflector 114 would preferably be coated with a reflective material, such as a metal foil, to provide the reflective surface, as is well-known in the art.

Located between upper and lower end walls 82, 84, and positioned between flanges 102, 104, is a lamp assembly 126 (FIGS. 3, 5, and 6), including a housing or lamp base 128 and a socket 130 extending therefrom. Socket 130 is adapted to receive a bulb or lamp 132 such as a miniature, incandescent bulb conventionally used in vehicular applications. Lamp assembly socket 130 has a diameter adapted to fit through opening 100 and hole 122 in reflector 114 so as to position lamp or bulb 132 at or proximate to a focal point of the reflector. The diameter of socket 130 may also be such to fit snugly within hole 122 in reflector 114 to help retain and properly locate the reflector within cavity 90. Lamp base 128 is also dimensioned to fit snugly between upper and lower end walls 82, 84 and between flanges 102, 104. Surface 134 at the base of socket 130 is preferably arcuate and conforms to the curved, intervening support 86. Lamp base 128 further includes detents 136 which extend from opposite sides of the base and are configured to engage notches 138 formed in flanges 102, 104. It is preferred that detents 136 are tapered and unidirectional in nature so that once lamp base 128 is inserted between flanges 102, 104, the lamp base cannot be withdrawn without wedging the detents out of the notches 138. Moreover, it is preferred that lamp housing 128 and the exterior surface of socket 130 be formed from a polymeric material, such as ALKRYN™ available from E.I. dupont, with a dimension slightly larger than the distance between flanges 102, 104 and the diameter of opening 100 so that the polymeric exterior forms a tight seal with opening 100 to prevent moisture and debris from entering cavity 90. In essence, the lamp assembly 126 provides a weather-tight seal about the entrance 100 to cavity 90.

Figure 2:
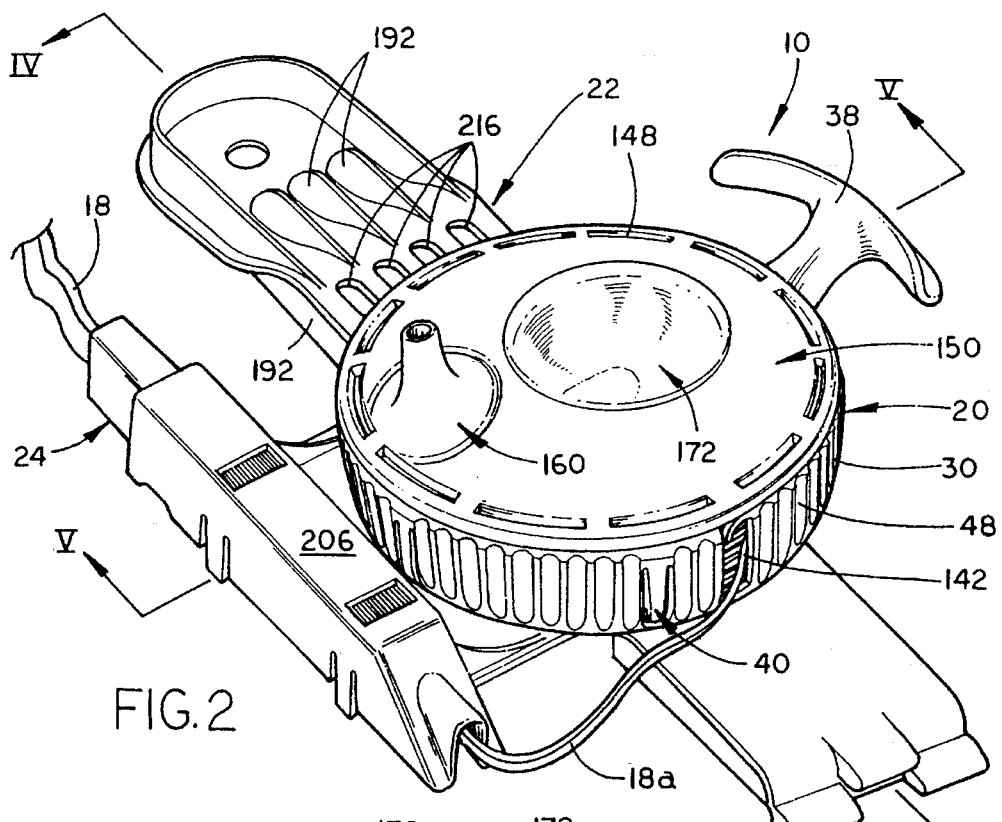
FIG. 2 is a perspective view of one embodiment of the invention when assembled.
Figure 3:
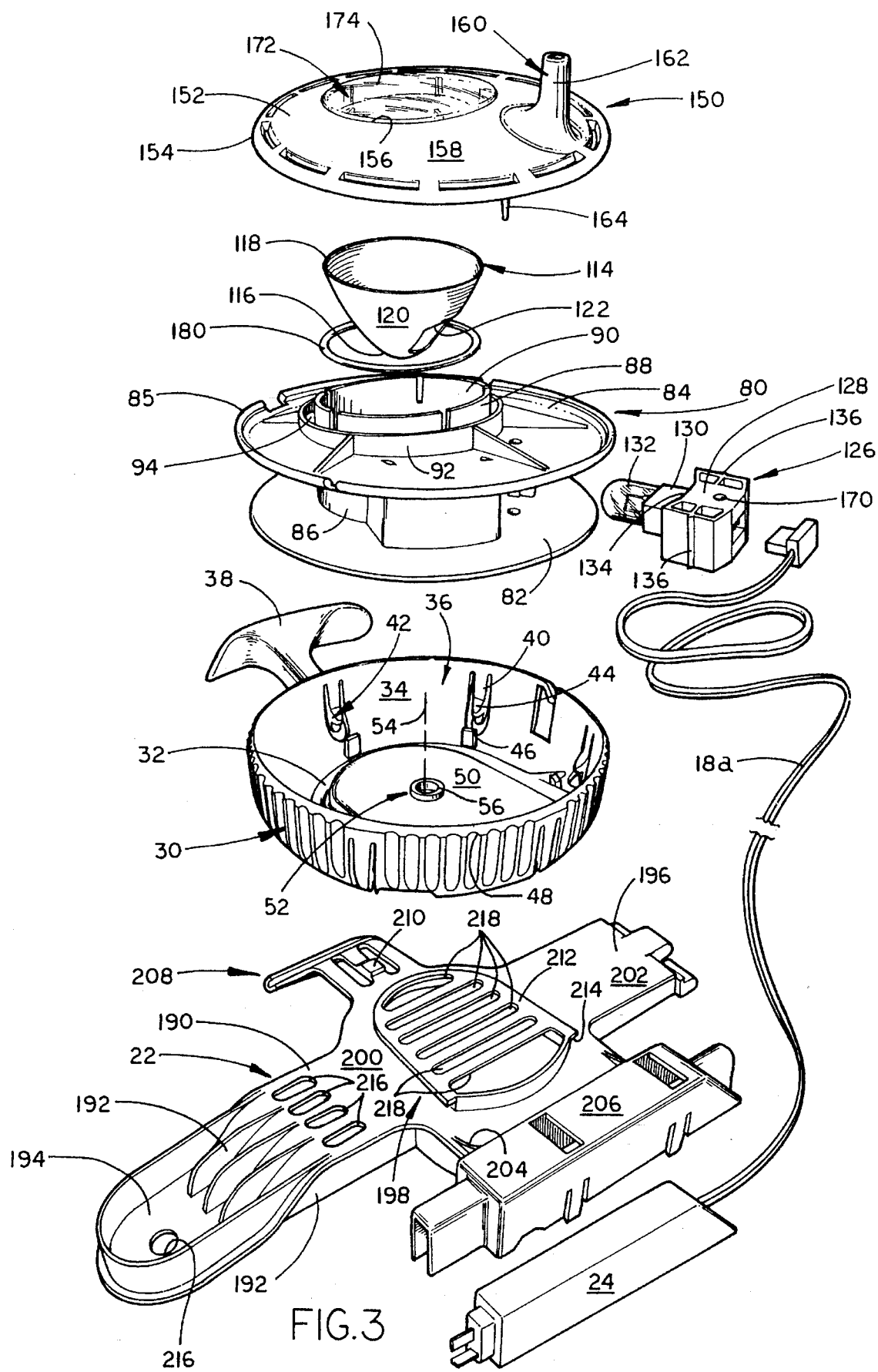
FIG. 3 is an exploded perspective view of the primary components in one embodiment of the invention.

Socket 130 includes terminals interconnected by conductor 18*a* (FIGS. 3 and 6). Conductor 18*a* extends from the end of lamp assembly 126 through a notch 142 (FIGS. 2 and 4) in container 30 and is coupled at an opposite end to the position-responsive switch 24 described above. It is preferred that conductor 18*a* have a length ranging between 10 and 50 feet. Conductor 18*a* may be stored on reel 80 around support wall 86 and contained between upper and lower end walls 82, 84.

Attached to spool 80 and substantially closing container 30 is a cap assembly 150. Referring to FIGS. 3 through 5, the peripheral edge 85 of end wall 84 is turned upward and slightly away from lower end wall 82 to receive edge 154 of cap assembly 150 in a snap-fit relationship. Cap assembly 150 includes a generally disc-shaped cap 152, having a peripheral edge 154, and a hole 156 located inboard from peripheral edge 154 and generally above axis 54. Extending from an upper surface 158 is a handle 160 located between hole 156 and peripheral edge 154. In one embodiment, peripheral edge 154 and cap 152 may be formed as an integral unit from a molded glass, polypropylene material such as ECTAR™ brand polypropylene available from Eastman Co. When molded as an integral assembly, stem 162 of the handle may be hollow to allow moisture and other debris within housing or casing 20 to drain and exit therefrom (FIG. 5). In the alternative, handle 160 may be comprised of a separate part attached to upper surface 158 by a fastener extending through cap 152. Additionally, cap 150 may contain one or more perforations 148 proximate peripheral edge 154 to provide drainage for moisture and debris trapped between the lower surface 166 of cap 152 and the upper end wall 84 of spool 80 (FIGS. 4 and 5).

In addition to the snap-fit coupling of cap peripheral edge 154 to the upper peripheral edge 85 of end wall 84, a drive pin 164 (FIG. 5) extends from a lower surface 166 of the cap, which aligns with and extends through a pair of aligned holes 168 (formed in end walls 82, 84) and hole 170 in lamp assembly base 128. Drive pin 164 positively couples cap 152 to spool 80 and also serves to positively lock lamp assembly 126 with the spool. Thus, any rotational motion imparted to cap 152 by the movement of handle 160 about axis 54 is also imparted to spool 80 through the snap-fit coupling relationship of the upper peripheral edge 85 of the spool with the cap, and by the drive pin 164 extending through the spool. In addition, should conductor 18*a* be completely unwound from spool 80, pin 164 prevents lamp assembly 126 from being pulled unexpectedly from its proper position in the spool and reflector.

Mounted within hole or opening 156 in cap 152 is a lens 172, preferably manufactured from amorphous nylon such as du Pont ZYTEL 330™ or Miles DURETHANE T40™. Lens 172 includes an outer, exposed, light-transmitting portion 174 which is slightly concave/convex so as to direct light produced by lamp 132 to form a predetermined target. Alternatively, lens portion 174 may be shaped so as to broadly cast the light to illuminate a large area thereby creating a flood light. It is contemplated that lens 172 may also be fitted with an adjustable lens to change the light between a beam or spot light and a broad-area or flood light, depending upon the desired need of the user. One alternative lens includes top cap 152 formed completely frown a light-transmitting material such as dupont ZYTEL 30™ or Miles DURETHANE T40™. In another form, top cap 152 can be dual shot molded with the area of lens 172 molded from a light-transmitting material such as those mentioned above, while the remainder is opaque.

Dependant from the peripheral edge of the lens light-transmitting portion 174 is an annular, cylindrical flange 176 dimensioned to fit tightly within annular channel 94 formed by the outer circumference of upper portion 88 and the inner circumference of wall 92. The bottom surface 178 of flange 176 is sealed against the bottom 96 of channel 94 by an O-ring 180 disposed within the channel. The dimensional tolerances between flange 176 and annular channel 94 are formed to mechanically retain lens 172 therein. Such retention also helps hold reflector 114 in place within cavity 90. The close tolerances, taken together with the seal between lens 172 and spool 80 formed by O-ring 180, will maintain the weather-tight integrity of cavity 90 containing the reflector 114 and the lamp 132. Lens 172 is also mechanically bonded about the upper portions of flange 176 to cap 152. This mechanical bond may be achieved by the application of an adhesive or by partial melting or fusing of the two materials.

Casing or housing 20 and position-responsive switch 24 are retained to the underside 12 of the vehicle hood 14 by mounting bracket 22 shown in FIG. 3. Bracket 22 is preferably molded from a polymeric material, most preferably a thirty percent glass polypropylene. Mounting bracket 22 includes a frame 190 which may be mounted directly to a surface or substrate such as the underside 14 of the vehicle hood 12. Frame 190 may have any one of a number of configurations, each of which can be specifically suited for the mounting location. However, it is preferred that frame 190 include a plurality of ribs 192 juxtaposed to each other and terminating in opposing flanges 194, 196 used to attach each end of frame 190 to the substrate. Preferably located toward the middle of frame 190 and on top of ribs 192, is a seat 198 defined by a platform 200. Platform 200 gradually blends in and merges with ribs 192 at one end and transitions to a sloped surface 202 at another end, proximate flange 196. Between flanges 194, 196, and extending laterally from ribs 192, platform 200 transitions to a generally curved or dished wall 204, which sweeps toward ribs 192 proximate flange 194. Extending from an upper peripheral edge of wall 204 is a switch housing 206 designed to receive position-responsive switch 24 and retain switch 24 on bracket 22 adjacent wall 204. Extending from platform 200 and oriented transversely to ribs 192 is a flexible latch 208 having a wedge-shaped detent 210 attached to engage the edge of container 30 on bracket 22 (FIG. 5). Also having a positive relief with respect to platform 200 and supported thereon, is a tongue-shaped ledge 212 corresponding in shape and size to recess 62 in container 30. The upper edge of ledge 212 further includes a flange 214 which is received by the tongue-shaped recess 62 in the bottom of container 30. Bracket 22 also includes a series of slots and holes 216, 218 extending therethrough for draining water or moisture from the bracket to prevent damage to the bracket and light assembly 10 (FIGS. 2 and 3).

Position-responsive switch 24 (FIG. 10) includes a housing 220 defining a rectangular volume and preferably made from a polymeric material such as ALKRYN™ plastic mentioned earlier. The dimensions of the housing are such that the longitudinal axis coincides with the length; the intermediate axis coincides with the height; and the short axis coincides with the width of the housing. Disposed at one end of the housing 220 and extending therefrom are a pair of terminals 224, 226 adapted to be engaged by a socket which has conductor 18 coupled to the power source of the vehicle, such as a battery. Terminal 224 is preferably attached to one wire lead of conductor 18a exiting the opposite end of housing 220 and interconnected with the lamp assembly described earlier. A conventional mercury switch 230 is disposed within housing 220 which interconnects the other wire conductor to terminal 226. The mercury switch is so oriented within housing 220 such that when the housing 220 is generally level, the switch is deactivated; however, when the housing is elevated such that the terminals are higher than the end of the housing containing the conductor pair 18a, the switch is activated. It is preferred that the ends of the terminals 224, 226, the mercury switch 230, and conductor 18a be encapsulated within the polymeric material forming housing 220. In this manner, the connections between the conductors, terminals, and the switch are protected from the elements by the polymeric housing and also safely retain the mercury therein. Alternately, other position-responsive automatic switches, or two- or three-position manual, non-mercury switches can also be used in this invention in place of mercury switch 230.

OPERATION

The utility/emergency light assembly 10 is adapted to be mounted by bracket 22 to the underside 12 of the vehicle hood 14 using conventional fasteners. In the alternative, the utility/emergency light assembly 10 may be attached to the interior of the car or to the trunk area of the vehicle. Although this discussion focuses on the application of the utility light assembly in connection with vehicles, it should be understood that the light assembly may have applications other than in vehicles such as earth-moving machinery, drill rigs, work shops, or the like.

When in the stored position, casing 20 is mounted on bracket 22 by slidably placing the tongue-shaped recess 62 on the lower surface 60 onto the complimentary shaped ledge 212 on the mounting bracket platform 200. When fully slid into position, the wedge-shaped detent 210 on latch 208 engages the lower surface 60 of container 30. The wedge-shaped detent 210 thus prevents container 30 from inadvertently sliding off of the bracket 22.

When stored and not in use, it is preferred that the switch 230 within switch housing 220 be oriented such that power is not supplied to light assembly 10. However, when the hood, trunk lid, or other substrate retaining bracket 22 is opened, it is preferred that switch 230 completes the circuit and power is supplied to the lamp assembly 126 to provide light to the area. When the engine compartment hood, trunk lid, or other substrate is closed, the switch 230 automatically interrupts the circuit and turns off lamp assembly 126.

If it is desired to take the light assembly 10 elsewhere, the operator depresses latch 208 and, using handle 38, pulls housing 20 off of mounting bracket 22. By gaining access to light assembly 10, the switch completes the circuit and lights the lamp or bulb 132. The operator is then permitted to pull the casing away from the bracket so as to pay out the conductor 18a coiled around the spool 80 until the operator has uncoiled enough conductor to place the light assembly where he or she desires. The light assembly may be appropriately positioned by swinging bail 70 out from the U-shaped channel 64 formed in the lower surface 60 of the container 30. The assembly may then be suspended by bail 70 (FIG. 8) or propped on the ground (FIG. 9) to light up the desired area. When the operator is finished with light assembly 10, the operator simply holds the assembly either by the handle 38 or by placing the container portion 30 in the palm of one hand. The cable can then be reeled up about the spool 80 by turning handle 160 to rotate cap assembly 150 and attached spool 80 within the housing. With the conductor 18a appropriately wrapped about spool 80, assembly 10 is stored on mounting bracket 22 by aligning the tongue-shaped recess 62 in the lower surface 60 with the complimentary ledge 212 extending from the mounting bracket platform 200.

If the light assembly 10 is disposed in a compartment open to moisture and debris, assembly 10 is stored such that moisture or debris do not accumulate in housing 20. In particular, any moisture entering the housing is allowed to drain therefrom through the hollow stem of the handle 160 and peripheral perforations 148 in the cap or top, or through drain hole 39. In addition, water can drain from bracket 22 through at least holes 216, 218 or other openings therein. The internal lamp assembly is protected from the elements by the sealing of the lamp assembly base with the spool. Moreover, lens 172 forms a weather-tight seal about the cavity 90 with the aid of the O-ring 180. The lamp assembly housing 128 is preferably formed in a manner similar to that of the position-responsive switch to form a weather-tight seal about the conductor 18a entering therein.

The invention described above offers the following advantages, including: a smaller package to fit neatly in a compact area, a lighter-weight package than previous utility/emergency lights, a shock-absorbing mounting bracket readily adapted to be mounted to a substrate, a secure attachment when the utility/emergency light assembly is stowed, and a universal grip for use by either left- or right-handed operators. The utility/emergency light assembly provides a dual function of an underhood/compartment courtesy lamp which turns on and off when the hood/gate is opened or closed and a detachable utility light for use as a hazard warning light to warn other drivers, or as a flashlight or emergency/trouble light to illuminate other areas inside or outside the vehicle. The spool stays with the light assembly making it easier to pay the conductor in and out and keeping the conductor wire clean. A convenient carry handle has been provided which helps support the light assembly when propped-up by the bail. Because the light assembly is hard-wired to the vehicle wiring harness, the lamp or bulb can be powered by the on-board OEM-supplied battery source. This results in a longer use period than available using conventional dry cell batteries such as used in flashlights. Because the lamp assembly is sealed within the rugged housing, the light assembly is suitable for storage in harsh environments such as an engine or storage compartment of a vehicle such as an automobile, watercraft, train, or plane prior to or after use. The light assembly may also be easily adapted for use in tool storage areas, use on oil derricks, or similar harsh environments.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A compartment light, for use in vehicles and machinery comprising:

a mounting bracket;

a position-responsive switch attached to said mounting bracket and adapted to be operably coupled to a power source;

a casing slidably received on said mounting bracket, said casing having a cylindrical opening in one side thereof and including a plurality of tabs;

a spool disposed within said cylindrical opening in said casing and having a peripheral edge; said tabs on said casing detachably retaining said spool within said casing; said spool adapted to receive an electrical conductor for reeling and unreeling therefrom with one end of said electrical conductor connected to said position-responsive switch;

a lamp assembly mounted on said spool, said lamp assembly including a lamp and electrical connections for connecting said lamp to an opposite end of said electrical conductor when installed on said spool;

a cap assembly attached to said spool and generally closing said cylindrical opening in said casing;

a lens mounted in said cap assembly substantially above and sealing said lamp assembly from moisture and debris; and said position-responsive switch adapted to control on/off activation of said lamp assembly upon movement of said mounting bracket.

2. The compartment light as defined in claim 1, wherein said casing includes an integrally formed handle extending from said casing.

3. The compartment light as defined in claim 1, wherein said spool is rotatably mounted within said casing;

said cap assembly including a handle extending therefrom for rotating said cap assembly and said spool within said casing.

4. The compartment light as defined in claim 1, wherein said casing includes a bail attached to a lower surface of said casing for supporting said casing when removed from said bracket.

5. The compartment light as defined in claim 1, wherein said position-responsive switch controls on/off operation of said lamp when said bracket is tilted beyond a predetermined angle.

6. The compartment light as defined in claim 1, wherein said spool is rotatably mounted within said casing about an axis concentric with said casing.

7. The compartment light as defined in claim 6, wherein said spool rotates about a center axle journaled within a ring defined in a bottom surface of said casing.

8. The compartment light as defined in claim 1, wherein said mounting bracket includes:

a base to be attached to a surface;

a seat defined on said base to receive said casing;

a catch on said seat for detachably locking said casing on said seat; and a retaining member defined in said seat adapted to slidably engage with said casing for retaining said casing on said bracket.

9. The compartment light as defined in claim 1, wherein said lamp assembly includes:

a reflector mounted within said spool having an apex, a focal point, and an opening therein proximate said apex; and said lamp extending into said reflector through said opening, said lamp positioned generally at said focal point of said reflector.

10. The compartment light as defined in claim 9, further including said lamp having a base portion attached to said spool and engaging said opening in said reflector for locating and retaining said reflector in said spool.

11. The compartment light as defined in claim 1, wherein said spool includes a cavity for receiving said lamp assembly, an upper edge of said cavity engaging in sealing relationship with said lens.

12. A detachable utility light assembly for vehicles and machinery comprising:

a housing;

a lamp assembly;

a mounting bracket having either a mounting member or a recess for slidably mounting said housing for said lamp assembly, and a releasable, flexible latch adjacent said mounting member or recess;

said housing having an opposite one of said mounting member or said recess in an exterior surface thereof for detachably, slidably receiving said mounting member or said recess of said bracket to retain said housing on said bracket, said housing having a portion adapted for engagement with said latch when said housing is mounted on said mounting bracket, said latch being disengagable from said housing portion for removal of said housing from said mounting bracket; and said lamp assembly sealed in said housing for emitting light.

13. The light assembly as defined in claim 12, further comprising:

a spool journaled for rotation in said housing and having a cavity for receiving said lamp assembly;

a cap attached to one side of said spool and generally closing said housing; and a lens extending through said cap and sealing with said spool over said cavity for transmitting light emitted by said lamp assembly.

14. The light assembly as defined in claim 12, wherein said housing includes a handle extending from said housing for holding said housing when separated from said mounting bracket.

15. The light assembly as defined in claim 12, further comprising a bail attached to said exterior surface of said housing for orienting said housing when separated from said mounting bracket.

16. The light assembly as defined in claim 12, further comprising a switch interconnecting said lamp assembly to a power source.

17. The light assembly as defined in claim 16, wherein said switch includes a position-responsive switch mounted to said mounting bracket.

18. A detachable utility light assembly for vehicles and machinery comprising:

a housing;

a lamp assembly;

a mounting bracket having either a mounting member or a recess for slidably mounting said housing for said lamp assembly;

said housing having an opposite one of said mounting member or said recess in an exterior surface thereof for detachably receiving said mounting member or said recess of said bracket to retain said housing on said bracket; and said lamp assembly sealed in said housing for emitting light;

a spool journaled for rotation in said housing and having a cavity for receiving said lamp assembly;

a cap attached to one side of said spool and generally closing said housing; and a lens extending through said cap and sealing with said spool over said cavity for transmitting light emitted by said lamp assembly;

said housing also including:

a member in a base of said housing and concentrically engaging said spool, about which said spool rotates; and a plurality of fingers engaging a peripheral edge of said spool for retaining said spool in said housing and providing a circumferential bearing surface.

19. The light assembly as defined in claim 18, wherein said lamp assembly includes:

a reflector disposed in said cavity of said spool;

a lamp disposed in said reflector for emitting light; and a switch assembly for turning said lamp on and off.

20. The light assembly as defined in claim 19, further comprising a length of conductor interconnecting said switch to said lamp, said conductor coilable around said spool and stored within said housing.

21. The light assembly as defined in claim 20, wherein said cap includes an anchoring member extending through said spool so that rotation of said cap rotates said spool within said housing.

22. A detachable utility light assembly for vehicles and machinery comprising:

a housing closed at one end and open at an opposite end to define a substantially cylindrical cavity having at least one wall upstanding perpendicularly from said one end, and a plurality of tabs defined in said upstanding wall, each tab having a boss extending into said cavity;

a mounting member on an exterior surface of said housing adapted to attach said housing to a support structure;

a spool journaled to said one end, engaging and retained by said plurality of tabs, for rotation within said housing and adapted to receive an elongated electrical conductor coiled thereabout for reeling and unreeling;

a top attached to said spool and substantially closing said open end of said housing;

a lamp assembly disposed in said spool and adapted for connection to the elongated electrical conductor; and a lens attached to said top and extending over said lamp assembly.

23. A light assembly as defined in claim 22, wherein said spool includes:

a hub portion having first and second ends;

at least one flange extending from said hub and having a diameter substantially greater than said hub for engaging said tabs to retain said spool in said housing; and a cavity defined in said hub of said spool for receiving said lamp assembly.

24. A light assembly as defined in claim 23, wherein said top includes:

a pin extending from a first surface of said top and through said at least one flange of said spool for positively coupling said spool and top together and for imparting a rotational movement to said spool upon rotation of said top;

a handle extending from a second surface of said top opposite said first surface and offset from a center of said top; and a hole extending through said top substantially centered over said lamp assembly for receiving said lens.

25. A light assembly as defined in claim 24 wherein said pin also engages said lamp assembly to retain said lamp assembly in said spool.

26. A light assembly as defined in claim 22 wherein said top includes a pin extending therefrom and engaging said spool and said light assembly to retain said lamp assembly in said spool.

27. A light assembly as defined in claim 22, wherein said lamp assembly includes:

a reflector disposed in said spool proximate said one end of said housing and having a focal point;

a lamp having a base portion retained by said spool and a bulb portion generally located at said focal point of said reflector.

28. A light assembly as defined in claim 22, further including a mounting bracket for detachably receiving said housing and mounting said housing to a surface.

29. A light assembly as defined in claim 28, wherein said mounting bracket includes a sliding retainer for engaging a corresponding structure in said housing for detachably retaining said housing on said mounting bracket.

30. A light assembly as defined in claim 22, further including a length of conductor for storage about said spool, with a first end electrically attached to said lamp assembly and an opposite end adapted for connection and disconnection from a power source.

31. A light assembly as defined in claim 30, further including a switch for activating said lamp assembly, said switch being connected to said opposite end of said conductor.

32. A light assembly as defined in claim 31, wherein said switch is a position-responsive switch.

33. A light assembly as defined in claim 22 wherein said top includes at least one drain hole for releasing water from said assembly.

34. A light assembly as defined in claim 33 including a handle extending from said top for rotating said top and spool, said handle being hollow and providing a drain for releasing water from said assembly; said housing also including a drain hole in said closed end.

35. A light assembly as defined in claim 22 including a mounting bracket for detachably receiving said housing and mounting said housing to a surface; said mounting bracket including at least one drain hole therethrough for releasing water collected by said bracket.

36. A utility light assembly for a vehicle, comprising in combination:

a mounting bracket for attachment to the vehicle, and having a male mounting member;

a position-responsive switch attached to said mounting bracket and adapted to be operably coupled to a power source;

a utility light housing having a cylindrical wall closed at one end, and open at an opposite end, said cylindrical wall containing a plurality of radially spaced tabs, said one end having a recess defined in an exterior surface configured to slidaly receive said male mounting member and detachably retain said utility light housing on said mounting bracket; and a top assembly closing said opposite end of said utility light housing and configured for rotational movement within said utility light housing, said top assembly including a spool disposed within said utility light housing detachably retained by said plurality of radially spaced tabs, a lamp assembly disposed within said spool and operably coupled to said position-responsive switch through a length of conductor storable on said spool.

37. A compartment light for a vehicle, comprising:

a mounting bracket;

a position-responsive switch attached to said bracket and configured to be coupled to a power source;

a casing slidably received on said bracket, said casing having a cylindrical opening in one side including a plurality of tabs defined in one wall of said casing;

a spool disposed within said cylindrical opening in said casing and detachably retained by said plurality of tabs, said spool adapted to receive a length of electrical conductor one end of which is connected to said position-responsive switch;

a lamp assembly mounted on said spool including a lamp and electrical connections for connecting said lamp to an opposite end of said electrical conductor;

a cap assembly attached to said spool and generally closing said cylindrical opening in said casing; and a lens mounted in said cap assembly substantially above and sealing said lamp assembly from moisture and debris;

said position-responsive switch adapted to control on/off activation of said lamp assembly upon movement of said mounting bracket.

* * * * *

UNITED STATES PATENT AND TRADEMARK OFFICE
CERTIFICATE OF CORRECTION

PATENT NO. : 5,521,806
DATED : May 28, 1996
INVENTOR(S) : Barry W. Hutzel et al.

It is certified that error appears in the above-indentified patent and that said Letters Patent is hereby corrected as shown below:

Column 3, line 47:
"frown" should be --from--.

Column 6, line 56:
"frown" should be --from--.

Column 14, line 2:
"slidaly" should be --slidably--.

Signed and Sealed this

Thirteenth Day of May, 1997

Attest:

BRUCE LEHMAN

*Attesting Officer*        Commissioner of Patents and Trademarks